United States Patent [19]

Andree

[11] Patent Number: 4,463,995

[45] Date of Patent: Aug. 7, 1984

[54] SAFETY MOUNTING FOR LARGE ANTIFRICTION BEARINGS

[75] Inventor: Dietrich Andree, Dortmund, Fed. Rep. of Germany

[73] Assignee: Hoesch Werke Aktiengesellschaft, Dortmund, Fed. Rep. of Germany

[21] Appl. No.: 450,288

[22] Filed: Dec. 16, 1982

[30] Foreign Application Priority Data

Dec. 24, 1981 [DE] Fed. Rep. of Germany ....... 3151277

[51] Int. Cl.³ .............................................. F16C 19/34
[52] U.S. Cl. ............................ 308/207 R; 308/189 R; 308/227; 308/1 A
[58] Field of Search ........... 308/1 A, 174, 175, 189 R, 308/207 R, 207 A, 216, 229, 230, 231, 232, 236, 227; 29/148.4 A

[56] References Cited

U.S. PATENT DOCUMENTS 2,643,920  6/1953  Olszewski .......................... 308/231
3,030,158  3/1962  Pöhler .................................. 308/230
3,144,278  8/1964  Pöhler et al. .................... 308/236 X
3,651,550  3/1972  Bennett .......................... 29/148.4 A
4,030,786  6/1977  Schluter et al. ..................... 308/227

Primary Examiner—Stuart S. Levy
Assistant Examiner—David Werner
Attorney, Agent, or Firm—Horst M. Kasper

[57] ABSTRACT

A safety mounting for large antifriction bearings comprises rolling members disposed at a first bearing ring, a second bearing ring engages the rolling members, and a combined attachment and retainer provision is disposed at the first bearing ring and positively locks the second bearing ring. The attachment aspect of the provision provides for mounting of connecting constructions to the bearing ring. These safety mountings are particularly suited for large antifriction bearings at excavators, dredgers and cranes. The combined attachment and retainer provision allows to save material, space and time.

14 Claims, 6 Drawing Figures

SAFETY MOUNTING FOR LARGE ANTIFRICTION BEARINGS

BACKGROUND OF THE INVENTION

Field of the Invention

The present invention relates to a safety mounting of large antifriction bearings for in particular excavators and cranes, where attachment provisions and retainer provisions are provided at the circumference, which connect the bearing rings to the connecting constructions.

Such safety attachments are employed with rotating machines in order assure that in case of an unforeseen disaster or catastrophy, such as for example in case of a breakage of the rotary connection, no endangering of the environment and the surroundings occurs and for example a change of the angle of the connecting construction is avoided.

Such a safety attachment is shown in German Petit Patent DE-GM No. 79 14 922, which attachment like a segment grips around the rotary range of a crane and avoids in case of a disaster that the rotatable upper part of the crane can disengage from the fixed position base of the crane caused by a breakage of the antifriction bearing.

A catch hook device is shown in the journal "Deutsche Hebe- and Fordertechnik", Issue 12/1977, page 607, FIG. 2, where the catch hook device is disposed on the side at the bearing ring and annular around the bearing.

Such safety attachments require additional, at least segment-shaped construction components as well as a large requirement regarding material and space.

SUMMARY OF THE INVENTION

1. Purposes of the Invention

It is an object of the present invention to provide a safety attachment at large antifriction bearings, where in particular the number of additional components required is kept low.

It is a further object of the present invention to provide a safety provision for large antifriction bearings, where a high operating safety is achieved while little space and material expenditures are required.

It is another object of the present invention to provide an safety provision for an antifriction bearing, which is capable to catch in case of a disaster the rotary connection at each position of the circumference with the same strength while not requiring additional labor costs for mounting.

These and other objects and advantages of the present invention will become evident from the description which follows.

2. Brief Description of the Invention

According to one aspect of the present invention there is provided a safety mounting for large antifriction bearings which comprises rolling members disposed at a first bearing ring, a second bearing ring engaging the rolling members, and a combined attachment and retainer provision disposed at the first bearing ring and positively locking the second bearing ring.

The bearing can support a machine for lifting goods such as for example a crane, a dredger, an excavator, a hoist, or a digger. The attachment and retainer provision can engage a collar attached to the second bearing ring. The combined attachment and retainer provision can comprise an attachment nut with a collar for limiting the possibility of motion of the second bearing ring. The combined attachment and retainer provision can comprise attachment bolts having a washer under the head of the bolt or a set collar for limiting the possibility of motion of the second bearing ring. The combined attachment and retainer provision can comprise attachment bolts retaining a retainer ring overlapping the second bearing ring. The retainer ring is preferably provided by way of a plurality of ring segments. The retainer ring can be provided with tapped holes and can be connected directly via the tapped holes to the attachment bolts.

There is also provided a method for safe mounting of antifriction bearings which comprises positioning two bearing rings with interposed rolling members and attaching and retaining at the same time one of the bearing rings via a combined attachment and retainer provision of the other bearing ring.

The attaching and retaining can be provided by employing attachment bolts having a collar for restricting the possibilities of motion of the second bearing ring versus the first bearing ring. The attaching and retaining can be provided for by employing attachment bolts pressing by way of a set collar. Alternatively, a washer can be employed instead of the set collar. The attaching and retaining can be provided for by employing a retainer ring kept in position by bolts. Holes can be tapped in the retainer ring and thus the retainer ring can be directly attached to the bolts.

The invention in particular provides the advantage by way of a disposition of the attachment provisions as close as possible at the region of the running course there is surprisingly transferred and/or supported in the case of a disaster a lower bending moment as at a possible breaking of the bearing. Advantageously, in addition no additional parts are necessary for the safety attachment, since the attachment elements already present, possibly formed as necked down bolts, can take on between the bearing rings and the connecting construction the function of a retainer provision according to the teaching of the present invention. In addition, no further mounting work is required.

The safety attachment in accordance with the present invention is further effective over the whole range, such that in the case of a disaster the rotary connection can be supported at each position of the circumference with the same advantageous effect.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawings, in which are shown several of the various possible embodiments of the present invention.

DESCRIPTION OF INVENTION AND PREFERRED EMBODIMENT

Figure 1:
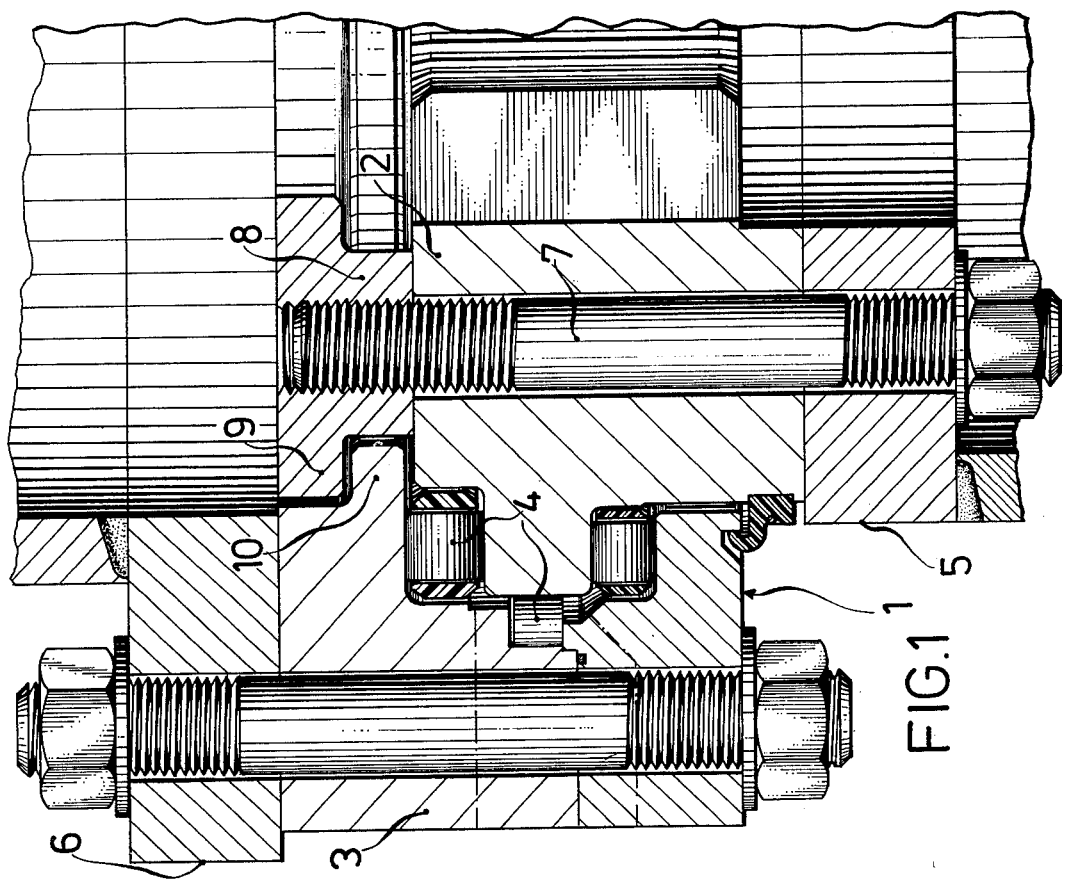
FIG. 1 is a partially sectional view of an attachment and retainer provision employing attachment nuts with a collar.
Figure 2:
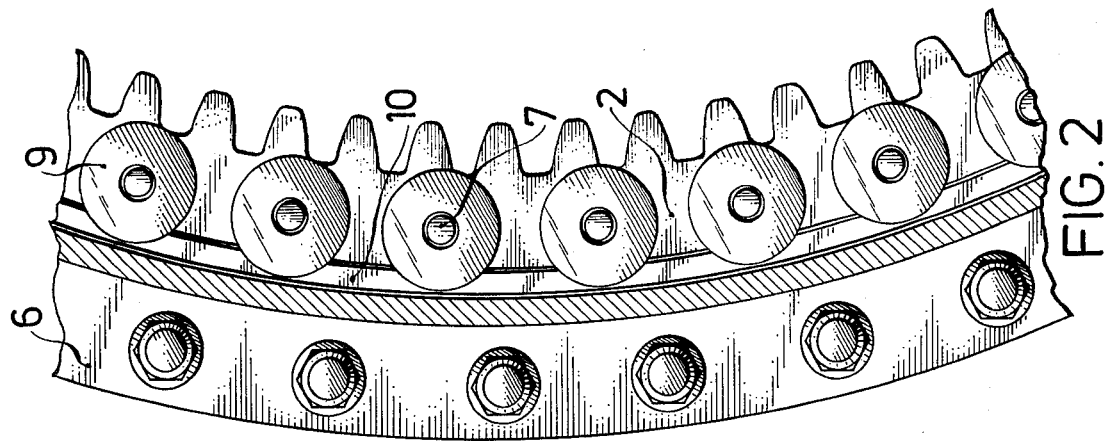
FIG. 2 is a partial plan view of the attachment and retainer provision of FIG. 1.

Like numerals in the following refer to like items in the drawing.

In accordance with the present invention there is provided a safety mounting at large antifriction bearings for in particular dredgers and cranes with retainer provisions and attachment means disposed at the circumference which connect the bearing rings with the connecting constructions. The attachment means 7, 8 or respective 11, 15 of a bearing ring are formed as a retainer provision and are positive lockingly connected to the other bearing ring. The other bearing ring can be provided with a collar 10. Attachment nuts 8 can be disposed having a collar 9. The fastening bolts 7 can be provided with a washer or a set collar 11. The fastening bolts 7 can support a retainer ring 15, preferably provided split up in segments, gripping over the other bearing ring. The retainer ring 15 with tapped holes can be connected directly to the fastening bolts 7.

Referring now to FIG. 1 there is shown part of a large antifriction bearing 1 comprising in each case an inner bearing ring 2 and an outer bearing ring 3 with antifriction rolling members 4 disposed in between. The lower connecting construction 5, for example the fixed bottom part of a crane, is attached to the inner bearing ring 2 and the upper connecting construction 6, for example the rotatable upper part of a crane, is attached to the outer bearing ring 3.

According to FIG. 1, the fastening bolts 7 of the inner bearing ring 2 are bolted with fastening nuts 8. These grip over with their collar 9 over a predetermined distance positively locking the collar 10 of the outer bearing ring 3.

Figure 3:
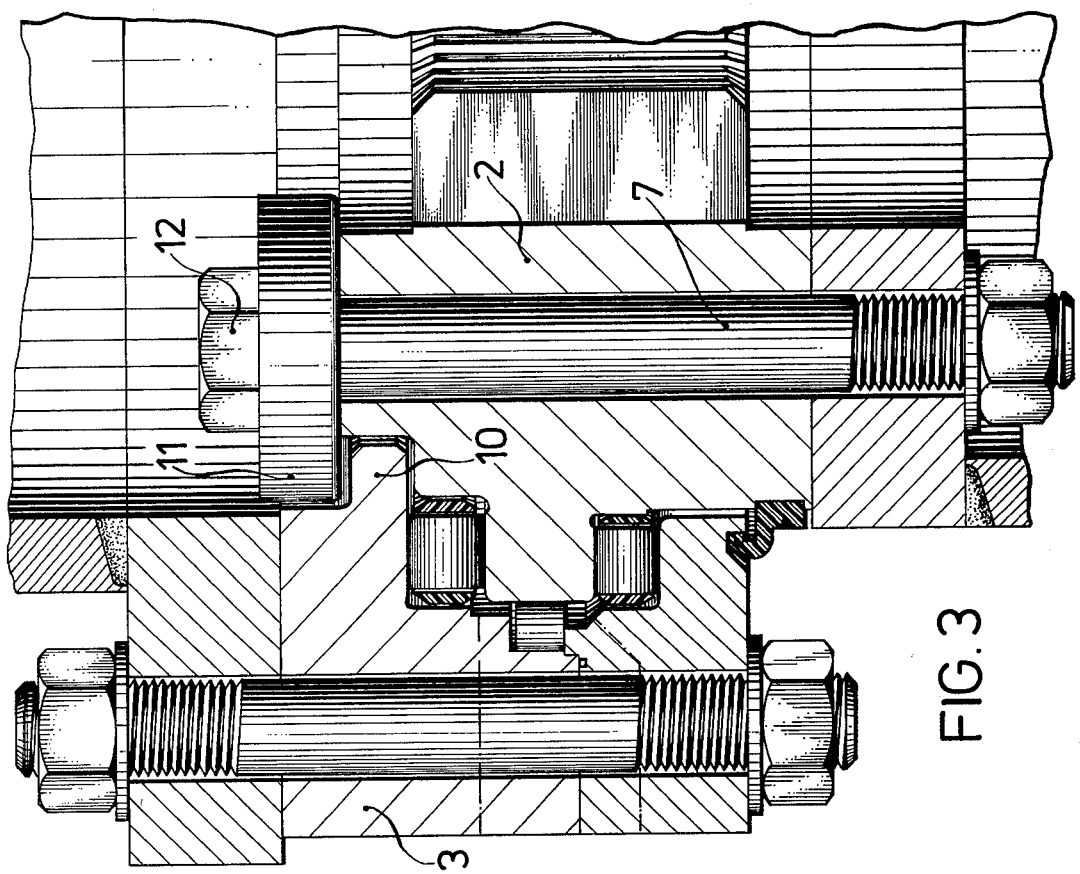
FIG. 3 is a partially sectional view of an attachment and retainer provision employing attachment bolts with washers.
Figure 4:
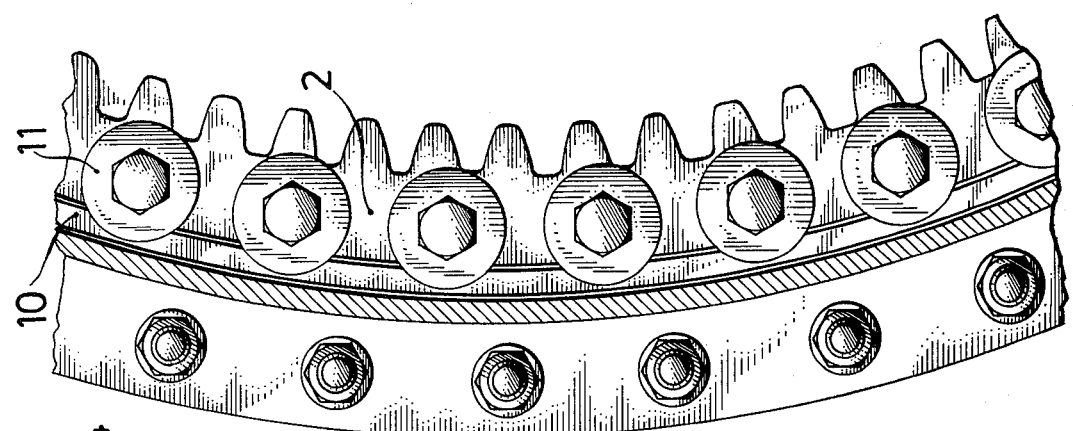
FIG. 4 is a partial plan view of the attachment and retainer provision of FIG. 3.

According to the embodiment of FIG. 3, the fastening bolts 7 of the inner bearing ring 2 are provided with a set collar 11, which grips positively locking over the collar 10 of the outer bearing ring 3 by a preset length. The set collar 11 is provided with an outer hexhead 12 or with another means allowing for gripping with a wrench. Instead of the set collar there can also be employed a washer properly fitted to match the geometrical configurations of the two bearing rings.

Figure 5:
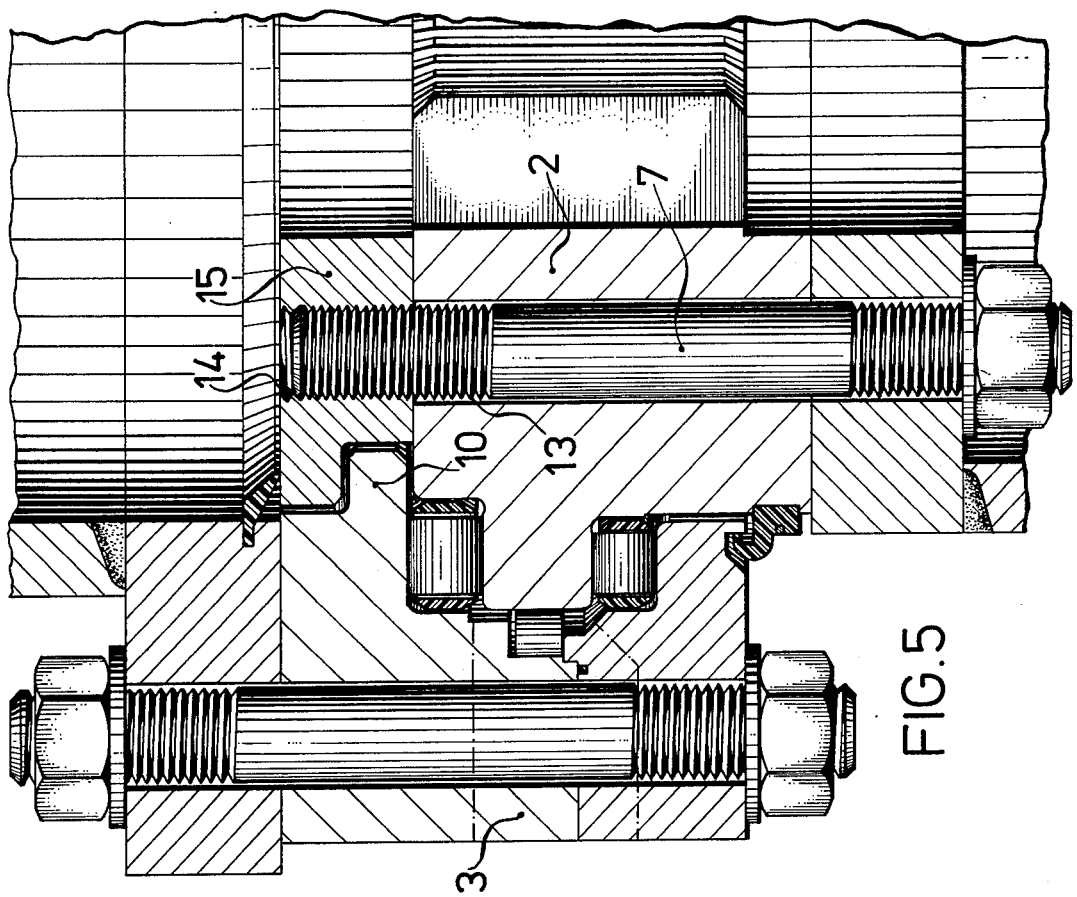
FIG. 5 is a partially sectional view of an attachment and retainer provision employing a retainer ring.
Figure 6:
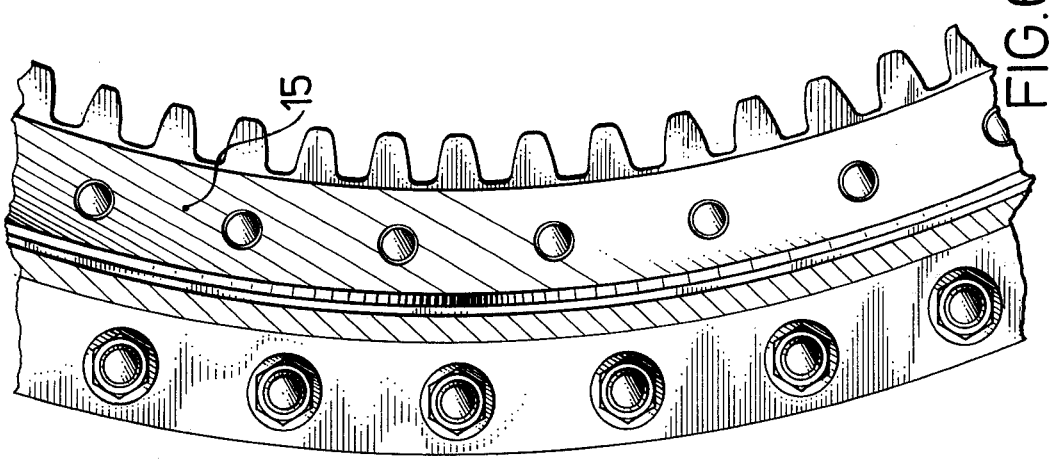
FIG. 6 is a partial plan view of the attachment and retainer provision of FIG. 5.

An outer thread 13 is disposed at the fastening bolt 7 in the embodiment of FIG. 5, which outer thread 13 is screwed into the tapped bore 14 of a retainer ring 15. The retainer ring 15 can be split up into segments. The retainer ring 15 grips over the collar 10 disposed at the outer bearing ring at a preset distance.

It will be understood that each of the elements described above, or two or more together, may also find a useful application in other types of rotary seatings and rotary support systems differing from the types described above.

While the invention has been illustrated and described as embodied in the context of a safety mounting at a large diameter antifriction bearing, it is not intended to be limited to the details shown, since various modifications and strutural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. Safety mounting for large antifriction bearings comprising
   a first bearing ring;
   rolling members disposed at the bearing ring;
   a second bearing ring engaging the rolling members such that the second bearing ring can rotate versus the first bearing ring; a circular radial projection disposed on the second bearing ring on the side located toward the first bearing ring and extending coaxially relative to with the bearing axis; and combined attachment and retainer provision disposed at the first bearing ring on the side toward the second bearing ring for forming an opening means and positively locking the second bearing ring by matching the circular radial projection.

2. The safety mounting for large antifriction bearings according to claim 1 wherein the bearing supports a goods lifting machine.

3. The safety mounting for large antifriction bearings according to claim 1 wherein the combined attachment and retainer provision comprises attachment nuts with a collar screwed onto bolts retained in the first bearing ring.

4. The safety mounting for large antifriction bearings according to claim 1 wherein the combined attachment and retainer provision comprises attachment bolts retained in the first bearing ring and provided with a set collar for forming an opening means and positively locking the second bearing ring by matching the circular radial projection.

5. The safety mounting for large antifriction bearings according to claim 1 wherein the combined attachment and retainer provision comprises attachment bolts retained in the first bearing ring and provided with a washer for forming an opening means and positively locking the second bearing ring by matching the circular radial projection.

6. The safety mounting for large antifriction bearings according to claim 1 wherein the combined attachment and retainer provision comprises attachment bolts held in the first bearing ring and retaining a retainer ring for forming an opening means and positively locking the second bearing ring by overlapping the circular radial projection.

7. The safety mounting for large antifriction bearings according to claim 6 wherein the retainer ring is provided by way of a plurality of ring segments.

8. The safety mounting for large antifriction bearings according to claim 6 wherein the retainer ring is provided with tapped holes and is connected directly via the tapped holes to the attachment bolts.

9. A method for safe mounting of antifriction bearings comprising
   positioning a first bearing ring;
   disposing rolling members at the first bearing ring;

disposing a circular radial projection on a second bearing ring on the side to be located toward the first bearing ring and coaxial with the bearing axis;

engaging the rolling members with a second bearing ring such that the second bearing can rotate versus the first bearing ring; and attaching and retaining at the same time the second bearing ring via a combined attachment and retainer provision of the first bearing ring on the side toward the second bearing ring for forming an opening means and positively locking the second bearing ring by matching the circular radial projection.

10. The method for safe mounting of antifriction bearings according to claim 9 wherein the attaching and retaining is provided by employing attachment nuts having a collar screwed onto bolts retained in the first bearing ring for forming an opening means and positively locking the second bearing ring by matching the circular radial projection.

11. The method for safe mounting of antifriction bearings according to claim 9 wherein the attaching and retaining is provided by employing attachment bolts retained in the first bearing ring and pressing by way of a set collar for forming an opening means and positively locking the second bearing ring by matching the circular radial projection.

12. The method for safe mounting of antifriction bearings according to claim 9 wherein the attaching and retaining is provided by employing attachment bolts retained in the first bearing ring and pressing against washers for forming an opening means and positively locking the second bearing ring by matching the circular radial projection.

13. The method for safe mounting of antifriction bearings according to claim 9 wherein the attaching a retaining is provided by employing a retainer ring kept in position by bolts held by the first bearing ring for forming an opening means and positively locking the second bearing ring by matching the circular radial projection.

14. The method for safe mounting of antifriction bearings according to claim 13 further comprising tapping a hole in the retainer ring and directly attaching the retainer ring to the bolts.

* * * * *

UNITED STATES PATENT AND TRADEMARK OFFICE
CERTIFICATE OF CORRECTION

PATENT NO. : 4,463,995

DATED : August 7, 1984

INVENTOR(S) : Dietrich Andree, et al

It is certified that error appears in the above-identified patent and that said Letters Patent is hereby corrected as shown below:

On the title page,
"Otto Giesser, Dortmung Fed Rep Germany" should be added as a co-inventor.

Signed and Sealed this

Seventeenth Day of December 1985

[SEAL]

Attest:

DONALD J. QUIGG

Attesting Officer

Commissioner of Patents and Trademarks